United States Patent
Tang (10) Patent No.: US 10,445,803 B2
(45) Date of Patent: Oct. 15, 2019

(54) SYSTEM AND METHOD FOR IMAGE PROCESSING STORING AND SHARING VIRTUAL FITTING EXPERIENCES

(71) Applicant: Grace Tang, Newark, CA (US)

(72) Inventor: Grace Tang, Newark, CA (US)

( * ) Notice: Subject to any disclaimer, the term of this patent is extended or adjusted under 35 U.S.C. 154(b) by 0 days.

(21) Appl. No.: 15/588,613

(22) Filed: May 6, 2017

(65) Prior Publication Data
US 2017/0293958 A1    Oct. 12, 2017

Related U.S. Application Data

(63) Continuation of application No. PCT/US2015/059619, filed on Nov. 6, 2015.

(51) Int. Cl.
| | |
|---|---|
| G06F 17/30 | (2006.01) |
| G06Q 30/06 | (2012.01) |
| G06T 11/60 | (2006.01) |
| G06T 17/05 | (2011.01) |
| G06T 19/00 | (2011.01) |
| G06F 16/432 | (2019.01) |
| G06K 9/00 | (2006.01) |
| G06T 11/00 | (2006.01) |

(52) U.S. Cl.
CPC ....... *G06Q 30/0621* (2013.01); *G06F 16/434* (2019.01); *G06K 9/00* (2013.01); *G06Q 30/0643* (2013.01); *G06T 11/00* (2013.01); *G06T 11/60* (2013.01); *G06T 17/05* (2013.01); *G06T 19/006* (2013.01); *G06T 2210/16* (2013.01)

(58) Field of Classification Search
CPC ..... G06F 17/30; G06F 17/30047; G06K 9/00; G06Q 30/0621; G06Q 30/0643; G06T 11/00; G06T 11/60; G06T 17/05; G06T 19/006; G06T 2210/16
See application file for complete search history.

(56) References Cited

U.S. PATENT DOCUMENTS

| | | | | |
|---|---|---|---|---|
| 2002/0164149 A1* | 11/2002 | Wilkinson | ........... | H04N 21/235 386/336 |
| 2011/0279475 A1* | 11/2011 | Ikenoue | ............... | G06K 9/6204 345/619 |
| 2013/0215116 A1* | 8/2013 | Siddique | ............ | G06Q 30/0643 345/420 |
| 2014/0176565 A1* | 6/2014 | Adeyoola | ............. | G06T 19/006 345/473 |

* cited by examiner

*Primary Examiner* — Sing-Wai Wu (57) ABSTRACT

In a multimedia device, a method, apparatus, and system for presenting image(s) and data to user, provide the means and methods for user to select image(s) and/or area(s) and combine them with other image(s), creating virtual visual results generated through a combination of a plurality of images. A method that creates natural looking virtual visual results through graphical image processing and generation. A system and method to generate virtual visual results using images displayed through web browsers. A method for creating and using re-generatable, editable and clickable imaging files, by embedding the image(s) and data in a specific file format, that can be created, edited, managed, saved, shared and transferred through web browsers, and/or other data communication channels.

23 Claims, 6 Drawing Sheets

SYSTEM AND METHOD FOR IMAGE PROCESSING STORING AND SHARING VIRTUAL FITTING EXPERIENCES

This application is a continuation of PCT Application No. PCT/US15/59619, filed on 2015 Nov. 6.

BACKGROUND OF THE INVENTION

1. Field of the Invention

This invention relates to a system and method for image processing and virtual fitting.

2. Description of Prior Art

For users, browsing through image items, find the ones they like, select said items and instantly virtually try on said items with users' photos and images, bring entertainment value to the users. It provides a novice personal experience to the users that they otherwise would not have access to without said virtual fitting system. Said virtual fitting system also gives users more enjoyable and personalized shopping experience. It helps the users to visualize how the products fit into their personal environments and/or on their bodies, and whether they fit with his/her style and taste, and make the purchase decisions. Said virtual fitting system helps vendors to increase sales and reduce return rates.

SUMMARY OF THE INVENTION

My invention creates a system that presents image(s) and data to user, provides the means and methods for user to select image(s) and/or area(s) and combine them with other image(s), creating a virtual visual result generated through a combination of a plurality of images. My invention includes a method that creates natural looking virtual visual results through graphical image processing and generation; and a system and method to generate virtual visual results using images displayed through web browsers. My invention also includes a method for creating and using re-generatable, editable and clickable imaging files, by embedding the image(s) and data in a specific file format, that can be created, edited, managed, saved, shared and transferred through web browsers, and/or other data communication channels.

A virtual fitting system contains and/or connects with an image and data repository. During the virtual fitting process, it loads image(s) and/or area(s) from said repository, combines them with other image(s) captured and/or selected by the user, so that said image(s) and/or area(s) blend in with said other image(s), creating new image(s) and/or virtual visual result(s).

By processing the images selected and/or captured by the user, through image cropping, positioning, scaling, rotating, stretching, zooming, compressing and etc, the virtual fitting system generates the combined virtual visual results using said processed images.

Further more, through the virtual fitting system, the user can input customization request, redesign the item(s), leave reviews and feedbacks, order and/or preorder product item(s), as well as conduct other user interaction activities by using the graphical user interface provided by said virtual fitting system.

In a multimedia device, a method, apparatus, and system for presenting image(s) and data to user, provide the means and methods for user to select image(s) and/or area(s) and combine them with other image(s), creating virtual visual results generated through a combination of a plurality of images. A method that creates natural looking virtual visual results through graphical image processing and generation. A system and method to generate virtual visual results using images displayed through web browsers. A method for creating and using re-generatable, editable and clickable imaging files, by embedding the image(s) and data in a specific file format, that can be created, edited, managed, saved, shared and transferred through web browsers, and/or other data communication channels.

It assist user to input their reviews, feedbacks, customization preference and etc into the virtual fitting system. User can select the product through the system, customize and redesign the product based on user's style and preference, place in the orders and/or preorder products when they are not available in the inventory. These data entered by the user is collected by the system, processed and send to the corresponding parties.

According to still another aspect, the virtual fitting system can collect and accumulate user input data, manage this data by data consolidation, processing, filtering, formatting and/or etc, and render a summarized representation of the data using charts, tables, diagrams, graphical images, reports and/or etc. This summarized representation of the data can be viewed by user through the reporting module of the virtual fitting system. This summarized representation of the data can also be saved in digital format such as a file, database and etc, and transferred to corresponding parties through an automatic or manual process, through wiring or wireless network and etc. This summarized representation of the data can also be printed out through printers for representation, as well as presented through other representation media for review and display.

According to still another aspect, the virtual fitting system can facilitate users to place in user feedbacks and customized orders for products. Vendors can present products that are available and/or not yet available on the market, as well as templates or prototypes of products to users through the virtual fitting system. User can review and/or preview these products, leave reviews, feedbacks, ratings for the products. Users can also customize and redesign the products based on his/her style and preference. The virtual fitting system collects the user input data from users, manage and process this data by data consolidation, processing, filtering, formatting and/or etc, and transfer the data to vendor. Users can also place in orders or preorder products with or without customizations through the virtual fitting system.

The virtual fitting system includes camera(s), touch screen display(s), processor(s), memory(s) and sensor(s). The system may also include units such as media storage, battery, input and output units, if not combined as part of another unit of the virtual fitting system. The system may also include an external display unit such as a TV, projector and/or etc.

The camera captures the images of the wearable product as well as images from the user, such as the body, face, hand and etc. The processor generates a plurality of matrices used and processes the images. The data storage stores the data and images, and the touch screen display displays graphic user interface and handles user interaction. The external display unit provides additional graphical displays to the user, potentially, on a large display surface.

According to one aspect, the virtual fitting system can be a portable media device also function as a solid-state drive for data storage. The form factor of the virtual fitting system can be hand-held and portable, or it can be a graphical display device with computation capability such as a touch screen TV. The virtual fitting system can also include a peripheral bus connector, a rechargeable battery, and one or more input and output devices. According to another aspect, the virtual fitting system has the capability to store media in persistent memory. Thereafter, when the virtual fitting system is again powered up, the stored media and data can be retrieved and utilized. According to still another aspect, the virtual fitting system can form, display and/or traverse image assets in an efficient manner.

BRIEF DESCRIPTION OF THE DRAWINGS

For a more succinct understanding of the nature and objects of the present invention, reference should be directed to the following detailed description taken in connection with the accompanying drawings in which.

DETAILED DESCRIPTION OF THE INVENTION

While the present invention may be embodied in many different forms, designs or configurations, for the purpose of promoting an understanding of the principles of the invention, reference will be made to the embodiments illustrated in the drawings and specific language will be used to describe the same. It will nevertheless be understood that no limitation of the scope of the invention is thereby intended. Any alterations and further implementations of the principles of the invention as described herein are contemplated as would normally occur to one skilled in the art to which the invention relates.

Figure 1:
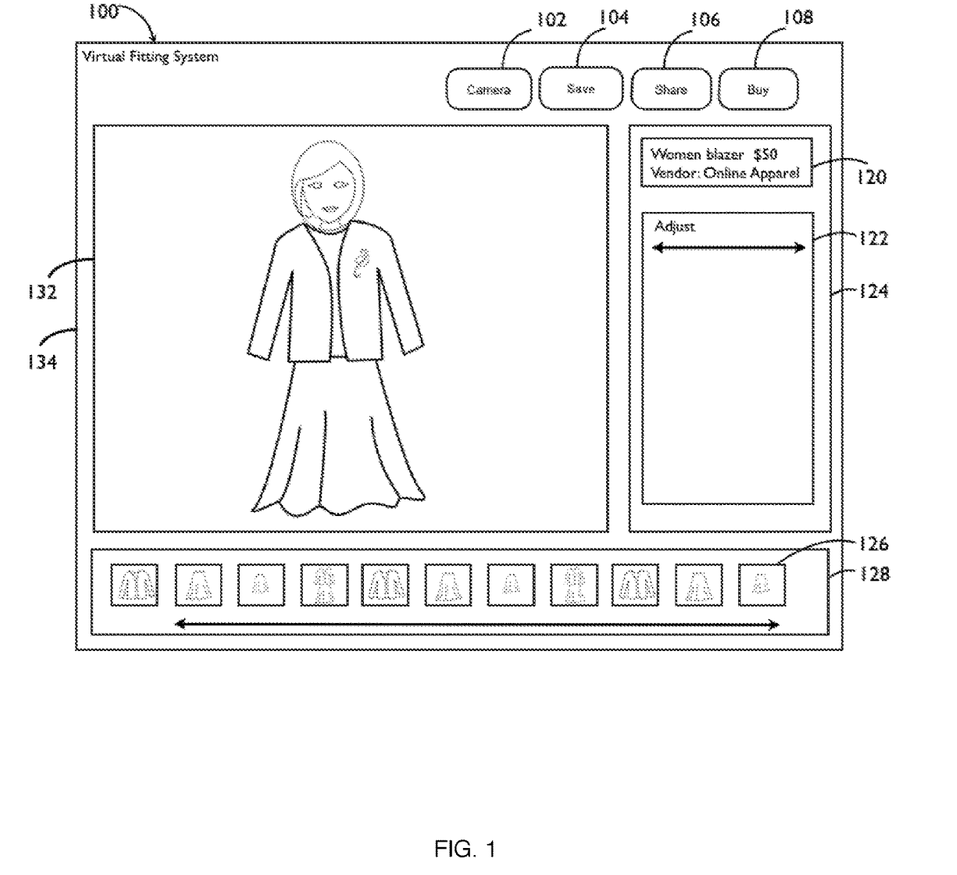
FIG. 1 is a diagram for a preferred embodiment of the implementation of the virtual fitting system.

FIG. 1, is a diagram of a virtual fitting system 100, according to one embodiment of the invention. For this implementation of the virtual fitting system 100, the user interaction is handled through the touch screen display 134. The list 128 that displays a list of available virtual fitting image components is loaded into the memory 208 when the virtual fitting system 100 is started. User can browse the image items to try on by scrolling the image list 128, user can select an image item by clicking on the image icon of that item, such as icon 126 that are listed in said list 128, and said system will display said image item in the graphical display area 132 of said system. User can add one or a plurality of image items, combine them with other image(s) selected and/or captured by said user, and generate a plurality of virtual visual result(s).

By clicking the camera button 102, user can capture new image(s) and/or video(s) using the camera of said system. By clicking the save button 104, user can save the visual result(s) displayed in graphical area 132 as image and/or video file(s). By clicking the share button 106, user can share said image and/or video file(s) through his/her social media network and/or other data communication channel(s). By clicking the buy button 108, user can enter the POS system where said item can be purchased, or find the location of store(s) where said item can be purchased, or access the online store where said item can be purchased, depending on variation of the implementations of said system.

Display area 120 displays data and messages related to the currently selected item(s) that are selected by said user, including but not limited to the price, description, source of said item and etc.

User can adjust the size, angle, color, transparency and/or other properties of said selected item(s) and/or image(s), using the user interface component(s) that are made available to receive user input on the display area 122.

Display area 124 can be made visible or invisible from user interface, upon receiving user input from said user.

Figure 2:
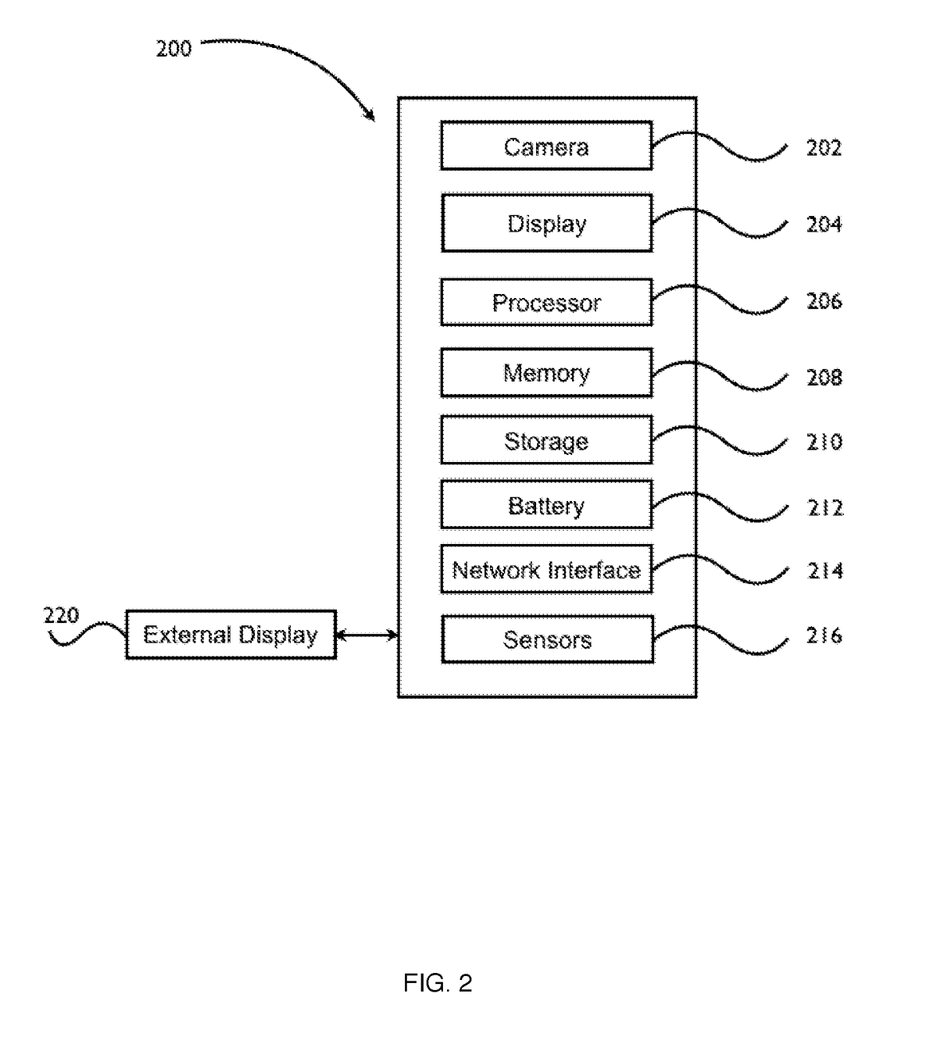
FIG. 2 is a block diagram of a virtual fitting system according to one embodiment of the invention.

When a user starts the virtual fitting process, he/she camera button 102, which enables the camera 202, to take a picture. The image is then display on the graphical display area 132. User browse the image item(s) using the image list 128, and select image item(s) by click on said image icon(s) 126, which will trigger said system 100 to add said selected image item(s) onto the graphical display area 132. Said system 100 combines said image item(s) with said other photo(s) taken and/or selected by said user, and generates visual virtual fitting result(s).

With reference to FIG. 2, a block diagram of the virtual fitting system 200, according to one embodiment of the invention. Any and all components of the virtual fitting system may execute as or on a touch screen mobile device such as a phone or tablet, a touch screen TV with computation capability, a computer system, and/or other possible multimedia devices with computation capability. As such, a basic virtual fitting system applicable to all these environments is described hereinafter.

In its most basic configuration, virtual fitting system 200 comprises at least one processing unit or processor 206 and system memory 208, a camera 202, a touch screen display 204. In embodiments, data and images are loaded into memory 208 and executed by the processing unit 206 from system memory 208. Depending on the exact configuration and type of system 200, memory 208 may be volatile (such as RAM), non-volatile (such as ROM, flash memory, etc.), or some combination of the two.

Additionally, virtual fitting system 200 may also have other components. For example, virtual fitting system 200 includes additional media storage 210, such as removable and/or non-removable media storage, including, but not limited to, SD memory card, magnetic or optical disks or tape. Virtual fitting system 200 may have battery 212 to provide power when not connected to an external power source.

The display may be embedded with touch sensors, thus function as a touch screen display 204. The virtual fitting system 200 may have network interface component 214, which handles the transfer of image and data to and/or from other devices, systems and/or networks.

Virtual fitting system 200 may have sensor component(s) 218, such as touch sensor, light sensor, GPS sensor, near field communication sensor and/or etc to handle the sensing, receiving, processing and transferring of data.

Virtual fitting system 200 can use an external display 220 to provide better visualization result; such external display 220 can be a TV, a projector device and/or etc. The external display 220 may be connected with the virtual fitting system

200 through wiring or wireless connections including but not limited to Wi-Fi, bluetooth connection and/or etc.

Figure 3:
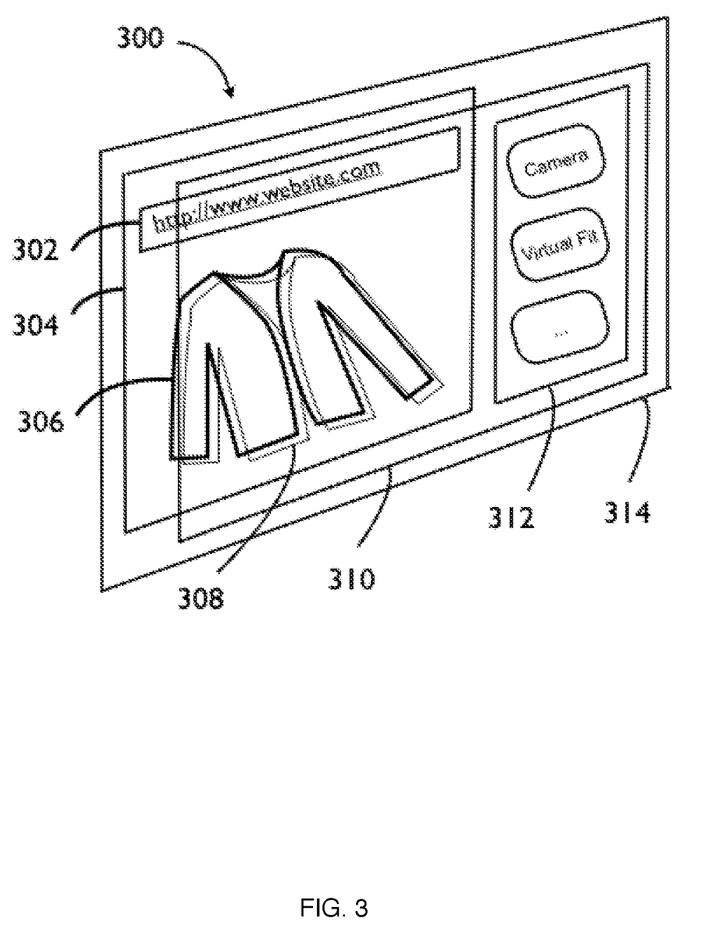
FIG. 3 shows an illustration of one embodiment of the implementation of the virtual fitting system with a web browser.
Figure 5:
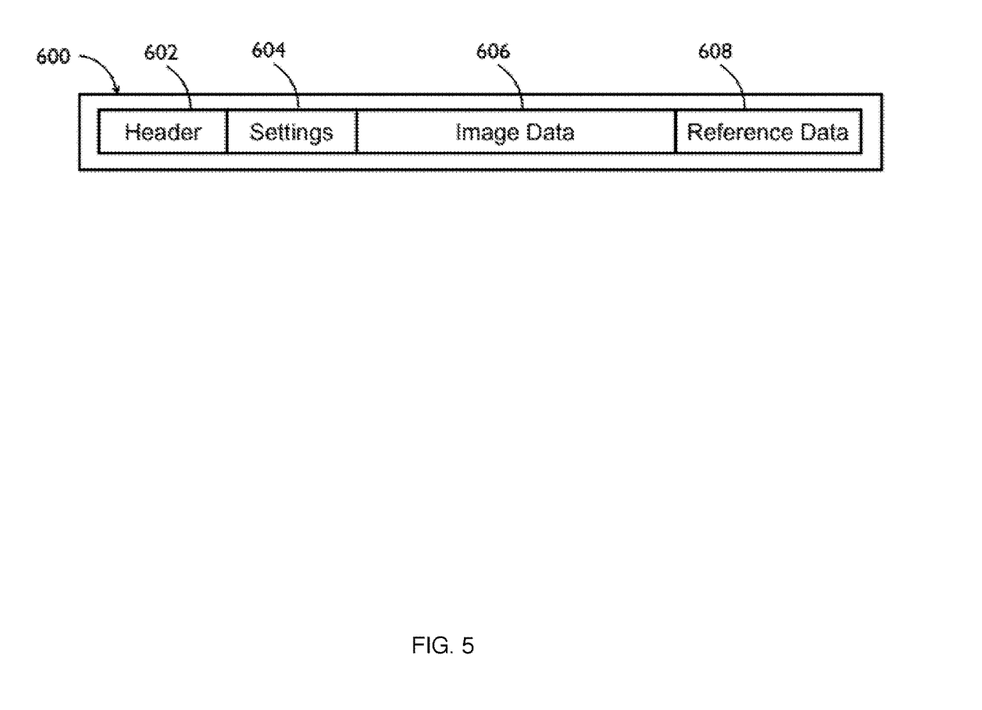
FIG. 5 shows an illustration of an imaging file with specific data structure, that is used to create repeatable, editable, clickable and shareable virtual visual experiences.

FIG. 3, is an illustration of an embodiment of a virtual fitting environment for implementing the embodiments with a web browser, such as virtual fitting system 300. A web browser 304 is displayed on the graphic display area 314 on said virtual fitting system 300. User can enter the website address and/or url manually through the url entry area 302. Said website address and/or web url can also be passed, received, and/or extracted from the messages, data and/or file 600 received by said system 300. Said web browser 304 can be automatically opened and/or displayed on said virtual fitting system 300 upon receiving said user input, data, file, and/or other condition(s) based on the variation of implementations of said system.

Area(s) and/or item(s) 306 on said virtual fitting system 300 can be made clickable, so that user can click on and/or select said area(s) and/or item(s) and use them for virtual fitting purpose. With another implementation, said area(s) and/or item(s) 306 can link with other button(s), clickable link(s), website url(s) and etc, that serve as placeholder(s) for receiving user input(s) for virtual fitting request(s).

With one implementation of said system, a transparent and/or partially transparent layer 310 is added on top of said web browser 304 on the graphic display area 314, to receive user inputs and/or commands. Upon receiving user input and/or data, said system 300 processes the data, and generates proper virtual visual results by combining, adjusting and processing the selected image(s), and displays said virtual visual results on the graphic display area 314. Other user interface components are displayed on the control area 312 of said virtual fitting system 300, to further assist the creating, editing, saving, sharing and etc of said virtual fitting experience.

Area(s) and/or item(s) on said virtual fitting system 300 can be clickable and serve as placeholder(s) to receive user input; and can be used to adjust and create customized user interface for users.

Figure 4A:
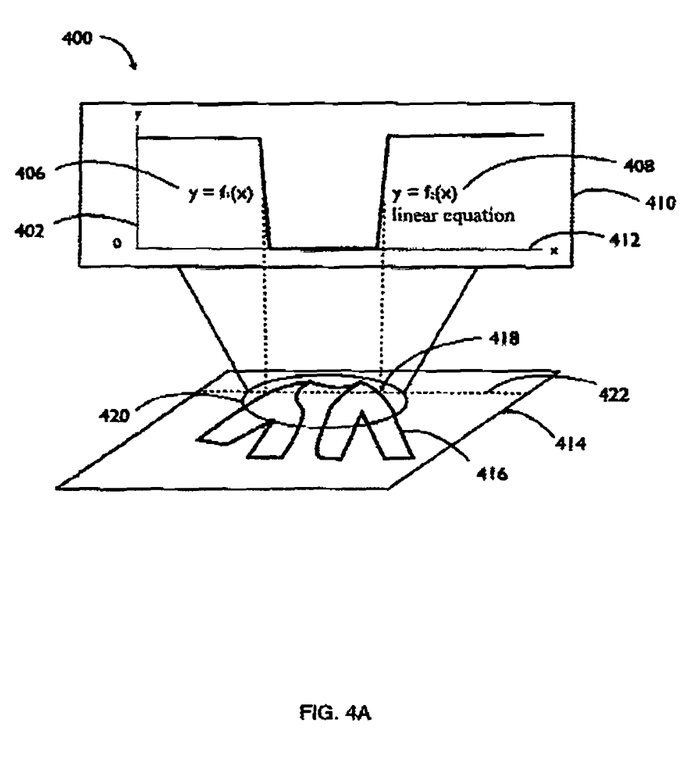
FIG. 4A shows an illustration of an imaging processing method for generating a better and more natural looking virtual fitting results with linear equations.

With reference to FIG. 4A, an imaging processing method for generating a better and more natural looking virtual fitting results are described herein. Mathematical equations 406 408 and calculations are applied when processing image area 416, which representing a blazer clothing item that is part of the another and/or original image 414, and its border 418. Area 416, area borders 418, and the original image 414 are processed to generate a partial image for that area, so that area 416 which represents a blazer clothing item can be used for virtual fitting purpose. In the illustration of the image processing system 400 in FIG. 4A, the x-axis 412 of the chart 410 corresponding to a line of pixels 422 that are located within the image area 420, the y-axis 402 of the chart 410 corresponding to the transparency value for the pixels located within said image area 402.

In FIG. 4A, linear equations 406 and 408 are used to calculate and process the borders 418 of said area 416, so that during virtual fitting, a gradual changing transparency levels are implemented around the border area. For the inside of the blazer image area 416, the original transparencies are retained for the pixels. For the outside of the blazer image area 416, the transparency levels are changed to be fully transparent. When said process image area 416 is used for virtual fitting, it will generate a more natural looking and better virtual fitting result as said image area 416 blends in with the background image(s), creating a result of said like-real virtual fitting result. So that the image, video and/or files in other formats saved from said virtual fitting result will also looks like an original image and/or video, instead of computer generated ones.

Figure 4B:
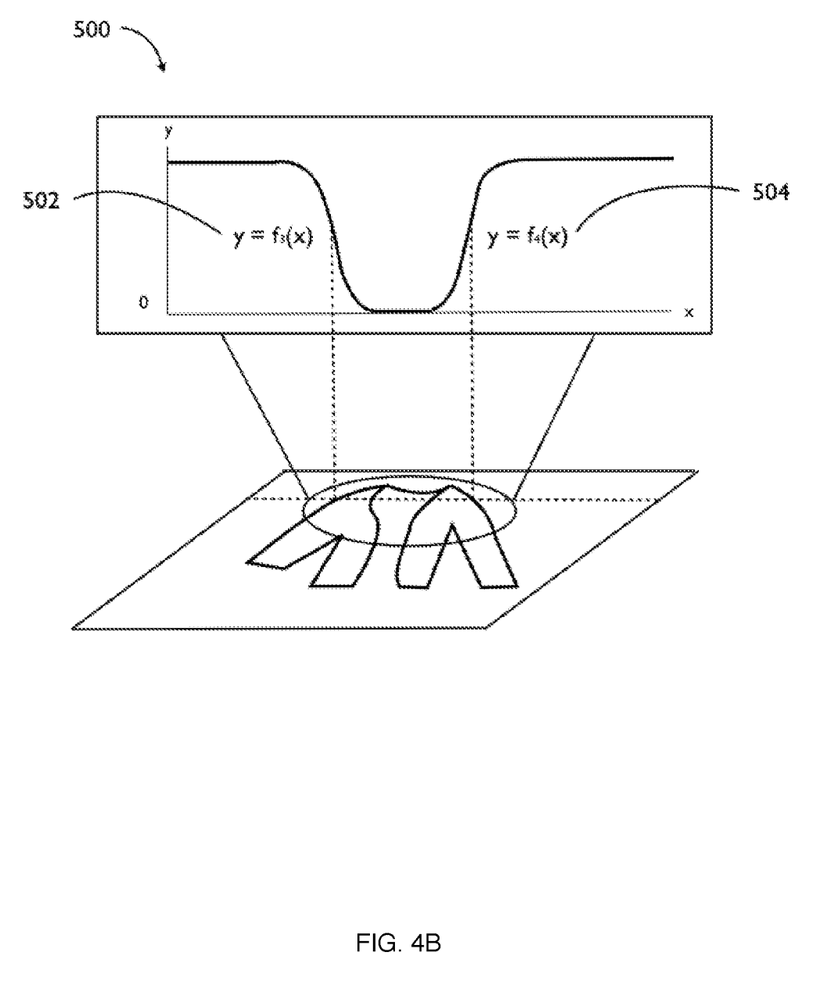
FIG. 4B shows an illustration of an imaging processing method for generating a better and more natural looking virtual fitting results with non-linear equations.

In FIG. 4B, non-linear equations 502 and 504 are used to process and editing the borders of said image area, to generate a more natural looking and better virtual fitting result.

One or a plurality of mathematical equation(s) can be applied and used to calculate and render the transparent and/or semi-transparent result(s), so that different area(s) of said image(s) have different level(s) of transparency; creating a gradual and/or changing virtual fitting visual result(s) of part and/or the entire image(s) disappearing, merging, blending in and/or show up on top of said other image(s).

One or a plurality of mathematical equation(s) can be used at different time(s) in a manual and/or automatic way; render the transparency and/or semi-transparency result(s) for part of and/or the entire image(s); to generate animated virtual fitting visual result(s).

One or a plurality of mathematical equation(s) can be used to change the transparency, color, size, angle, and/or other properties of part of and/or the entire image(s); to generate specific visual result(s) in an animated or none-animated way.

With reference to FIG. 5, a file 600 with specific data structure is used to embed, manage, save and store setting(s) for processing and/or handling image(s) and/or components(s) of said image(s), to initiate the means for said setting(s), image(s) and/or component(s) to be extracted from said file(s) at a later time. Said extracted setting(s), image(s) and/or component(s) can be used with or without new image(s) and/or data, to reproduce, continue, update and/or create new virtual visual results. FIG. 5 describes a file 600 in its raw data format, which is an array of bytes. Said file 600 starts with a header 602, which describes to the system and its receiving systems what type of file it is, and also includes the data for the components included in the file. Instead of a traditional image and/or video files that end with the file extension .bmp, .jpg, .png, .mp4 and etc, said file is of a new file format with a new file extension. For the purpose of clearly describing this method, I name it .vpg file format, where in 'v' stands for virtual, and 'pg' is used to indicate that it is a type of file related to imaging.

A .vpg file is a re-generatable, editable and transferrable file that contains one or a plurality of images, settings and data; that can be regenerated, edited, managed, saved, shared and/or transferred among digital devices.

A .vpg file includes one or plurality of images stored in raw data format at image data section 606 of the file 600; as well as the settings stored in raw data format at settings section 604 of the file 600, to properly process and/or handle the image(s) with corresponding settings. Said .vpg file also includes data stored in raw data format at the reference data section 608 of the file 600. Said data is related to said image(s), that includes but not limited to the source of the image(s), specific website address(es), url(s) and/or landing page(s) that are intended for said image(s), clickable link(s) and etc for said image(s) and etc.

The header 602 in the data structure of a .vpg file 600 indicates to the system that sends, receives and handles the file that it is a .vpg file format, or in other words, a re-generatable, editable and sharable imaging file. The header 602 may also contain other information such as the index of the byte array where the settings section 604 starts, how many bytes are used for settings section 604, how many image(s) are included in the file, the index of the byte array where the image data section 606 starts, the indexes where each of the include image(s) starts in the byte array of the .vpg file 600, and the length of each image(s); the starting index for the reference data section 608 and etc. In other words, the header is a map of the location and length of each section of the .vpg file.

The settings section 604 of the .vpg file includes the methods and parameters to handle area(s), component(s), properties of one and/or a plurality of the image(s). For example, it may contain mathematical equation(s) for properly processing and/or editing the borders of a certain area in an image that is included in the image data section 606 of the .vpg file 600, so that when a system receives and opens the file, it can automatically extract the image(s) and data from the file, process said image area using said mathematical equation(s), and generating preferred visual results. For another example, it may contain parameters of the location of an image area, and how said image area should be scaled and/or rotated for the virtual fitting purpose.

Said settings section 604 may also includes settings on how to incorporate said image(s) with new image(s) added by the receiving party. For example, a user uses the virtual fitting system 100 and creates a visual result of him wearing a hat, standing on the top of a tower. He saves this visual result as a .vpg file 600, and shared it with his friend. When his friend receives this .vpg file on his system, the system recognizes that this is re-generatable and editable imaging file, by parsing the file extension of said file. By reading the header of said .vpg file, said system maps the location and the length of each section of said .vpg file, and parsing in the data in its raw data format. Said system then reconstructs the image(s), area(s) and component(s) using the raw data, it also reconstructs the settings, parameters, equations, instructions and etc by parsing and using the data extracted from the settings section 604 of the .vpg file 600. Said system then displays said visual image(s) on the graphical display area 204 of said system. It may also display said visual image(s), area(s) and component(s) on the graphical display area 132 of said system 100. Using the touch screen display 134 of his virtual fitting system 100, his friend can load and/or select an image of his own, and the system 100 will process the image(s) using the settings that are extracted from said .vpg file, and re-generate new image(s) of his friend wearing said hat, standing on the top of said tower, in the same style as he did, that was saved and sent to his friend in the .vpg file. In other words, the .vpg file supports a repeatable, editable and sharable virtual experience, that can be created, edited, managed, saved, shared and/or transferred among digital devices.

The reference data section 608 of the file 600 contains information and/or data is related to said .vpg file and its image(s) and data. It may include the source of the image(s), specific website address(es), url(s) and/or landing page(s) that are intended for said image(s), clickable link(s) for said image(s) and etc. Continue with the above example, the website address for purchasing said hat can be stored in said reference data section 608 of said .vpg file 600. When his friend receives said .vpg file 600, loads and displays said image(s) on his virtual fitting system 100, said reference data including website address for purchasing said hat is also extracted from said .vpg file, and referenced with the image(s) on said system 100. By clicking on the buy button 108 on his virtual fitting system 100, said system 100 opens up a web browser with said website address, and displays the webpage for purchasing said hat. So that his friend can not only instantly try on said hat, but also purchase said hat with a single, double and/or a few clicks.

The order, name, length and other properties of the sections in the .vpg file may vary based on different ways of implementation of this method. The name of the file as well as the file extension may vary based on different ways of implementation of this method.

Said .vpg file can be viewable, sharable and made clickable through tradition image processing and displaying programs including buy not limited to the programs that handle .jpg, .png and etc image files, and/or .gp4 and etc video files. Said .vpg file can be distributed through web browsers, social media networks, and/or other data communication channels.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

Although the invention is described herein with reference to the preferred embodiment, one skilled in the art will readily appreciate that other applications may be substituted for those set forth herein without departing from the spirit and scope of the present invention.

What is claimed is:

1. A method of generating natural looking virtual fitting results, storing and sharing virtual fitting experiences in a reusable, editable and transferrable virtual fitting experience package file:
    a. providing a memory configured to store a plurality of virtual fitting images, pixels, configuration settings, mathematical equations and data in said memory;
    b. providing a data structure for storing said plurality of virtual fitting images, pixels, configuration settings, mathematical equations and data in raw data format in said memory;
    c. providing a header section in said data structure, containing information including the metadata of said file, the starting index and length of each section and other related information in said virtual fitting experience package file;
    d. providing a network interface component handling the transferring and receiving of said package file, image and data to and from other devices;
    e. providing a memory controller configured to:
        i. compress and package said virtual fitting images, pixels, configuration settings, mathematical equations and data according to said data structure into raw data format, store said raw data in said virtual fitting experience package file, save said package file in said memory;
        ii. transfer said virtual fitting experience package file through said network interface component;
        iii. receive said virtual fitting experience package file through said network interface component;
        iv. uncompress and open said virtual fitting experience package file, read said information stored in said header section, use said information and said data structure to parse out said images, pixels, configuration settings, mathematical equations and data stored in said package file;
        v. automatically regenerate said virtual fitting experience using said virtual fitting images, pixels, configuration settings, mathematical equations and data;
        vi. automatically process, configure and/or edit said virtual fitting images using said mathematical equations stored in said data structure;

f. providing a display being operatively connected to said memory for displaying said regenerated virtual fitting experience to users;

g. providing a user interface for said users to use said regenerated virtual fitting experience, said images, pixels, configuration settings, mathematical equations and data, and to combine with their own images, creating likewise virtual fitting visual results;

wherein said virtual fitting experience package file being utilized for supporting repeatable, editable and sharable virtual experience, that can be recreated, edited, managed, configured, saved, shared and transferred through web browsers, and/or other data communication channels, and wherein the mathematical equations being applied to calculate and process the images for generating preferred visual results including changing the transparency levels of the pixels located on and around the border lines of the virtual fitting image areas.

2. The method of claim 1, further comprising sharing said virtual fitting experience package file, along with message(s), data, website address, url links, buttons and landing pages, through social media networks and/or other data communication channels.

3. The method of claim 1, wherein said memory controller further configured to embed said shared virtual fitting experience package file with data, url links, buttons and/or other clickable elements; so that upon receiving and clicking on said files reproducing, configuring, continuing, updating and/or creating new virtual fitting visual results, and creating sharable virtual fitting experience among users.

4. The method of claim 3, wherein the url links of said virtual fitting experience package files being displayed through a web browser; said users being able to select, mark area(s) on top of said web browser; generating virtual fitting experience and images by combining said area(s), object(s) with said other image(s) selected by said users; and to edit said results, generate virtual fitting results, view, edit, manage, save, share and/or transfer said results as virtual fitting experience package file, image, video and/or file(s) in other formats.

5. The method of claim 3, wherein the url links of said virtual fitting experience package files being embedded in area(s) being displayed through web browser(s) as part of a bigger image(s) or as individual image(s), being made clickable and served as placeholder(s) for receiving user input for creating virtual fitting experience.

6. The method of claim 1, further comprising purchasing products and/or services, entering customization request, redesigning product(s), entering review, comments and feedbacks; communicating with providers, vendors, designers and/or other corresponding parties; through said memory controller.

7. The method of claim 1, wherein said memory controller is further configured to generate reports for data received, processed and sent.

8. The method of claim 1, wherein said memory controller further interact with or be part of a point of sale system.

9. A method of generating natural looking virtual fitting results for a user by gradually changing transparency levels along border lines of partial image areas and/or image areas of objects in virtual fitting images, comprising:

a. providing a memory configured to store a plurality of images, mathematical equations, pixels, configuration settings and data in said memory;

b. storing said virtual fitting images with nontransparent partial image areas of virtual fitting items situating on top of transparent backgrounds in said memory;

c. providing a memory controller configured to:
 i. recognize the border lines of said partial image areas in said virtual fitting images;
 ii. automatically locate pixels situated on said border lines;
 iii. automatically and mathematically create an x-axis and y-axis for each pixel situated on said border lines, said x-axis rendering a straight line crossing said pixel, extending from said nontransparent partial image areas to said transparent background, representing the distance of an adjacent pixel to said pixel situated on said border line, said y-axis forming a right angle to said x-axis representing the level of transparency of the corresponding pixel on said x-axis;
 iv. use predefined equation(s), mathematically calculating transparency levels for said pixels located on said x-axis;
 v. modify the transparency levels of said pixels located on said x-axis and adjacent to said border lines, gradually changing said transparency levels from nontransparent for said pixels inside said partial image areas to fully transparent for said pixels outside said partial image areas;
 vi. save said modified pixels with said modified transparency levels and the remaining part of said virtual fitting images as modified virtual fitting images in said memory;
 vii. repeat and update the transparency levels for all the pixels situated on and adjacent to said border lines of said partial image areas for said virtual fitting images;

d. providing a display which is operatively connected to said memory for displaying said modified virtual fitting images stored in said memory, placing them on top of background images chosen by the user, and rendering virtual fitting visual results;

wherein said modified virtual fitting images being used for improving virtual fitting results as said partial image areas on said virtual fitting images blending naturally with said background images, creating like-real natural virtual fitting visual results.

10. The method of generating natural looking virtual fitting results in accordance with claim 9, wherein said partial image areas being clickable and serving as placeholder for receiving user clicking input, said memory controller loadings, rendering and/or customizing user interface for said user to virtual fit said areas.

11. The method of generating natural looking virtual fitting results in accordance with claim 10, wherein said partial image areas being linked with other buttons, clickable links, website urls and landing pages, serving as placeholders for receiving user inputs for virtual fitting requests.

12. The method of generating natural looking virtual fitting results in accordance with claim 9, wherein said partial image areas, objects and/or image further configured to be automatically selected and used as components for creating virtual fitting experience.

13. The method of generating natural looking virtual fitting results in accordance with claim 9, wherein said memory controller further providing a manual or automatic way to process said virtual fitting images that including said partial image areas and/or object(s); editing said virtual fitting images so that semi-transparent border lines being rendered and/or created around said areas; generating virtual fitting results showing said areas blending in with other image(s), creating a natural looking and/or like-real virtual fitting results.

14. The method of generating natural looking virtual fitting results in accordance with claim 9, wherein said memory controller further providing a manual or automatic way to process said virtual fitting images, so that part of or the entire image(s) becoming transparent or semi-transparent; and creating the virtual fitting visual results of part and/or the entire image(s) disappearing, merging, blending in and/or showing up as part of and/or on top of other image(s).

15. The method of generating natural looking virtual fitting results in accordance with claim 14, wherein the mathematical equations being applied and used to calculate and render the transparent or semi-transparent results, so that different partial image areas of said part of or the entire image(s) having different levels of transparency; creating a gradual and/or changing virtual fitting visual results of part of and/or the entire image(s) disappearing, merging, blending in and/or showing up as part of and/or on top of said other image(s).

16. The method of generating natural looking virtual fitting results in accordance with claim 14, wherein the mathematical equations being used at different time(s) in a manual or automatic way; rendering transparency or semi-transparency results for part of and/or the entire image(s); and generating animated virtual fitting visual results.

17. The method of generating natural looking virtual fitting results in accordance with claim 9, wherein the mathematical equations being used to change the transparency, color, size, angle, and/or other properties of part of and/or the entire image(s); and to generate specific virtual fitting visual results in an animated or non-animated way.

18. The method of generating natural looking virtual fitting results in accordance with claim 17, wherein said animated or non-animated virtual fitting visual results further configured to reproduce and/or update said virtual fitting visual results, being managed, saved, stored and/or recorded as image, video and/or file(s) in other formats.

19. The method of generating natural looking virtual fitting results in accordance with claim 9, wherein said virtual fitting visual results further configured to reproduce and/or update said virtual fitting visual results, being managed, saved, stored and/or recorded as virtual fitting experience package file, image, video and/or file(s) in other formats and made sharable and/or transferable through social media networks and/or other data communication channels.

20. The method of generating natural looking virtual fitting results in accordance with claim 9, wherein said partial image areas being embedded and/or linked with clickable data elements, upon clicking on said data elements, said linked data elements being invoked and made active, resulting in change of behavior of said virtual fitting visual results.

21. The method of generating natural looking virtual fitting results in accordance with claim 9, wherein said memory controller further configured for embedding, managing, saving and storing settings for processing and/or handling virtual fitting images and/or components of said images, in a data structure of files; and reproducing and/or creating specific virtual fitting visual results using said settings, images and/or components.

22. The method of generating natural looking virtual fitting results in accordance with claim 21, wherein said memory controller further configured for enabling said settings, images and/or components to be extracted from said file(s), and being used with or without new image(s) and/or data, to reproduce, continue, update and/or create new virtual fitting visual results.

23. The method of generating natural looking virtual fitting results in accordance with claim 21, wherein said memory controller further formatting said file(s) as re-generatable, editable, clickable and sharable imaging file(s), being managed, shared and/or transferred through web browsers, social media networks, and/or other data communication channels.

\* \* \* \* \*